United States Patent
Miller et al.

(10) Patent No.: US 10,310,842 B1
(45) Date of Patent: Jun. 4, 2019

(54) RECOMMENDATION SYSTEM FOR SOFTWARE UPDATES

(71) Applicant: International Business Machines Corporation, Armonk, NY (US)

(72) Inventors: Keith J. Miller, Pawling, NY (US); Anthony Sofia, Hopewell-Junction, NY (US); Marna Walle, Pawling, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/828,710

(22) Filed: Dec. 1, 2017

(51) Int. Cl.
G06F 9/44 (2018.01)
G06F 8/65 (2018.01)
G06F 8/10 (2018.01)
G06F 11/34 (2006.01)
G06F 8/71 (2018.01)

(52) U.S. Cl.
CPC ............... G06F 8/65 (2013.01); G06F 8/10 (2013.01); G06F 8/71 (2013.01); G06F 11/3409 (2013.01); G06F 2201/88 (2013.01)

(58) Field of Classification Search
None
See application file for complete search history.

(56) References Cited

U.S. PATENT DOCUMENTS

| | | | |
|---|---|---|---|
| 6,610,103 B2 | 8/2003 | Ehrman et al. | |
| 6,751,794 B1* | 6/2004 | McCaleb | G06F 8/65 717/168 |
| 7,296,189 B2 | 11/2007 | Day et al. | |
| 7,698,170 B1 | 4/2010 | Darr et al. | |
| 8,265,984 B2 | 9/2012 | Bai et al. | |
| 8,924,265 B2 | 12/2014 | Selinger et al. | |
| 2009/0007108 A1* | 1/2009 | Hanebutte | G06F 11/3409 718/1 |
| 2009/0132347 A1 | 5/2009 | Anderson et al. | |
| 2014/0067727 A1 | 3/2014 | Greene et al. | |
| 2014/0122229 A1 | 5/2014 | Clark et al. | |
| 2015/0348163 A1 | 12/2015 | Tamblyn et al. | |
| 2015/0356637 A1 | 12/2015 | Graffia, II et al. | |
| 2016/0378455 A1* | 12/2016 | Lochan | G06F 8/65 717/169 |
| 2017/0076312 A1 | 3/2017 | Sharma et al. | |

(Continued)

OTHER PUBLICATIONS

Bolhuis; "Managing Your IBM i PTFs", Frankeni Technology Consulting, LLC, Oct. 10, 2013, pp. 1-81.

(Continued)

*Primary Examiner* — Qamrun Nahar
(74) *Attorney, Agent, or Firm* — Cantor Colburn LLP; William Kinnaman (57) ABSTRACT

Embodiments of the invention are directed to methods for recommending software updates for a computer system. The method includes receiving a request to find software updates from a requesting computer system. The method further includes analyzing specifications of the requesting computer system and determining similar computer systems. The method further includes determining a subset of software updates for recommendation based on the determination. The method further includes presenting the subset to the requesting computer system.

8 Claims, 5 Drawing Sheets

(56) References Cited

U.S. PATENT DOCUMENTS

2017/0168691 A1     6/2017   Johansson

OTHER PUBLICATIONS

Giering; "Retail Sales prediction and Item Recommendations Using Customer Demographics At Store Level", ACM SIGKDD Explorations Newletter, vol. 10, Issue 2, Dec. 2008, pp. 84-89.

Verhoef et al.; "Customer Experience Creation: Determinants, Dynamics and Management Strategies", Journal of Retailing, vol. 85, Issue 1, Mar. 2009, pp. 31-41.

Virginie et al.; "Customer Segmentation Based on a Collaborative Recommendation System: Application to a Mass Retail Company", Louvain School of Management Research Institute, Oct. 2012, pp. 1-13.

* cited by examiner

RECOMMENDATION SYSTEM FOR SOFTWARE UPDATES

BACKGROUND

The present invention relates in general to the field of computing. More specifically, the present invention relates to systems and methodologies for improving the roll-out of software updates.

In modern computing systems, computer software is occasionally updated for a variety of reasons. The software might be updated to provide additional functionality, to maintain compatibility with new versions of an operating system, or to fix various issues. In consumer-based systems (such as mobile electronic devices and home computers), such software updates (also called a "patch" or a Program Temporary Fix (PTF)) are often "pushed" to users. In other words, the updates are automatically sent to the user. There may be several reasons for such a policy. For example, a software company might want to ensure that all their customers have the latest update for security reasons. A software company might want to have as few versions being used to make supporting software easier. A software company that makes games might want to ensure that all users have the same version of software because of possible changes in the rules or rosters of the game.

However, for computer systems that are not operated by consumers (such as mainframe computers), the users are typically more sophisticated and might not want software updated until they are ready to update the system. For example, an administrator of a mainframe system might not want to install a software update on a live system handling millions of transactions or dollars per day before thoroughly testing the software update.

SUMMARY

Embodiments of the invention are directed to methods for recommending software updates for a computer system. The method includes receiving a request to find software updates from a requesting computer system. The method further includes analyzing specifications of the requesting computer system and determining similar computer systems. The method further includes determining a subset of software updates for recommendation based on the determination. The method further includes presenting the subset to the requesting computer system.

Embodiments of the present invention are further directed to a computer system for recommending software updates. The system includes a memory and a processor system communicatively coupled to the memory. The processor is configured to perform a method that includes receiving a request to find software updates from a requesting computer system. The method further includes analyzing specifications of the requesting computer system and determining similar computer systems. The method further includes determining a subset of software updates for recommendation based on the determination. The method further includes presenting the subset of software updates to the requesting computer system.

Embodiments of the invention are directed to a computer program product for recommending software updates for a computer system. The computer program product includes a computer-readable storage medium having program instructions embodied therewith, wherein the computer-readable storage medium is not a transitory signal per se. The program instructions are readable by a processor system to cause the processor system to perform a method that includes receiving a request to find software updates from a requesting computer system. The method further includes analyzing specifications of the requesting computer system and determining similar computer systems. The method further includes determining a subset of software updates for recommendation based on the determination. The method further includes presenting the subset of software updates to the requesting computer system.

Additional features and advantages are realized through techniques described herein. Other embodiments and aspects are described in detail herein. For a better understanding, refer to the description and to the drawings.

BRIEF DESCRIPTION OF THE DRAWINGS

The subject matter that is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of embodiments of the invention, as described above, computer systems include both hardware and software. The software can include both an operating system and application programs. Software is periodically updated for a variety of different reasons. Commonly, those reasons can include the addition of new features, support of new hardware, and bug fixes that solve various issues with the software.

Some computer systems are "closed" in that the hardware is fixed. For example, game consoles generally have a limited number of hardware configurations. In addition, for competitive reasons for on-line gaming purposes, it is important for all versions of software be the same. In such cases, software updates are "pushed" to each computer. Push means that the software is automatically sent to each computer via an Internet connection. The time of the push could be a set time or it could be when the software is executed.

As opposed to the push method of software updates, there is a "pull" method of software updates. In a pull method, a computer's user has to initiate an update. There are a variety of different situations in which a computer system administrator might want to use a pull method as opposed to a push method. For example, a computer system in which uptime is of prime importance might not benefit from push updates. First, a push update could take the system offline while the update is taking place. Second, unforeseen interactions can occur after a software update. For certain systems, a system administrator might not want to update a system until testing has been performed.

Turning now to an overview of the aspects of embodiments of the invention, one or more embodiments of the invention address the above-described shortcomings of the prior art by generating a list of recommended updates to a system, based on the hardware and software installed and a variety of other factors. The recommendations are customized based on the configuration of the hardware and software to determine the best updates to install.

Figure 1:
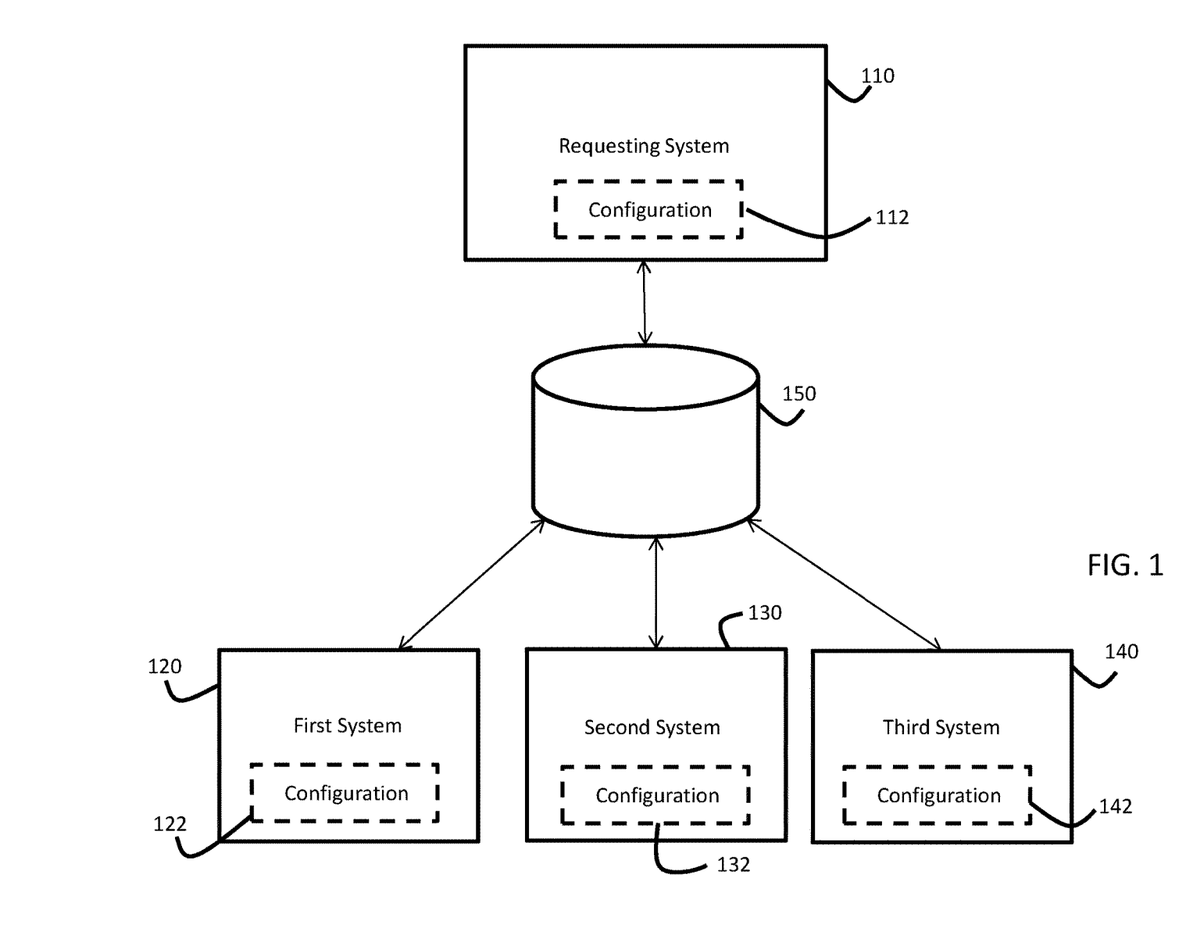
FIG. 1 is a high-level block diagram illustrating an exemplary data processing system in accordance with one or more embodiments of the present invention.

With reference to FIG. 1, a block diagram 100 presenting a broad overview of the actions taken in one or more embodiments is provided. Other figures will elaborate on FIG. 1.

Block diagram 100 shows the interactions between a requesting computer system and other systems. Requesting system 110 is a computer system including a variety of hardware and software. The configuration of the hardware and software is gathered in configuration block 112. Thereafter, when a request is made for recommended updates, the hardware and software configuration is consulted.

In a similar manner to requesting computer system 110, there is also present a first system 120, a second system 130, and a third system 140. For each of computer systems 120, 130, and 140, the hardware and software configuration is determined and stored (blocks 122, 132, and 142, respectively).

The configurations (112, 122, 132, and 142) are sent to a central database 150. Central database 150 includes the hardware and software configuration of each of computer systems 110, 120, 130, and 140. Central database 150 also includes information about each update sent to each of computer systems 110, 120, 130, and 140. In such a manner, when requesting system 110 requests a software update, central database 150 can be consulted to determine similar software and hardware configurations in order to determine optimum updates to send to computer system 110. Thereafter, recommendations are provided to requesting system 110. The recommendations are also stored in central database 150.

It should be understood that, while only four computer systems are shown in FIG. 1, embodiments are not so limited. There can be hundreds, thousands, or more computer systems present in one or more embodiments. The more computer systems that are coupled to central database 150, the more accurate the recommendations are.

It should also be understood that central database 150 can be encrypted. Furthermore, any connection between any of computer systems 110, 120, 130, and 140 and the central database 150 is also encrypted. The encryption can be performed in any manner, such as transport layer security or any other type of encrypted connection now known or developed in the future. In such a manner, there is no identifiable information present in central database 150. Therefore, if the operator of computer system 110 is a competitor to the operator of computer system 120, neither operator gains any unfair advantage by determining the configuration or capabilities of their competitor's computer systems.

Figure 2:
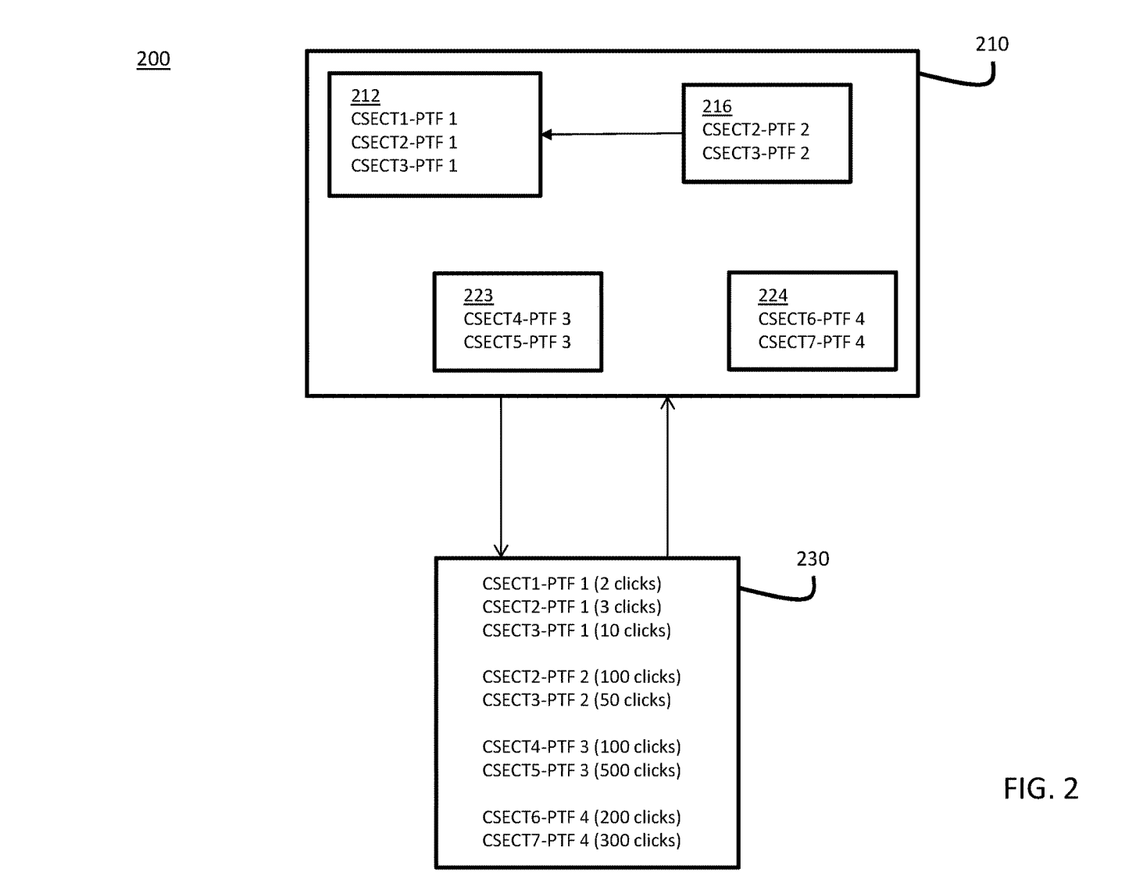
FIG. 2 is a high-level block diagram of an exemplary requesting computer system in accordance with one or more embodiments of the invention.

With reference to FIG. 2, a block diagram 200 illustrating an overview of a main customer's computer system is presented. The main customer's computer system of FIG. 2 can be the same as main customer's computer system 110.

The capabilities of main customer's computer system can be determined using a central processing unit measurement facility (CPU MF) in conjunction with hardware instrumentation services (HIS) to locally gather information about the computer system. The computer system in question can be any type of computer system. In some embodiments, the computer system is a computer system that includes multiple processors. Each of the processors can include multiple cores. In some embodiments, the computer system is a mainframe computer system.

CPU MF operates by utilizing counters for each processor in computer system 210. The counters can count events for each processor, such as cycles used, instructions, and cache events. In such a manner, the performance capabilities of computer system 210 can be determined. The performance capabilities can include any performance issues or how a specific CSECT is executed in the system (explained in greater detail herein). CPU MF can also be used to take a snapshot of information of each processor in a computer system. The information can include instruction address, primary address space number, and state information. Since the counters can be used to pull performance, the data can be combined together in unison with other computer systems to determine how each computer system is running based on currently installed software.

Other methods can be used to collect system information. These other methods can include reading function calls, reading system logs, and scanning system events. Sampling can be performed to determine instruction addresses, primary address space, and state information during the processing of certain tasks. This allows an analysis to map instruction addresses into modules or tasks to facilitate determination of hot spots. The data can be used to get the "clicks" on different control sections (CSECTS) within the patch. (A patch typically contains one or more CSECTS). A patch is divided into one or more CSECTS. Each CSECT can be analyzed to determine the number of "clicks" on the CSECTS in unison with dependencies between the various patches in relation to the pooled order data.

A click is a determination of how relevant a certain CSECT is for a particular operation. If more clicks are present for a particular CSECT, then that CSECT is more relevant to a particular computer system. A click can be defined as a way of determining if a CSECT has executed in the system during a given time interval. This can be determined from function calls, from scanning system events, and the like, to determine if a CSECT has executed. In some embodiments, a click is a counted execution instance.

Block 210 represents the consolidated software inventory (CSI) of the main customer's computer system. The CSI is a catalog of all the software installed on the computer system. The CSI is used to correlate the click data to each PTF. Using this information allows one to group together PTF based off the clicks and SMP/E logic. By grouping this data, the most used PTFs can be determined as well as dependencies between the CSECTS and PTFs.

As shown in block 210, a list of available patches or PTFs is gathered. Within each PTF, the relevant CSECT is determined. In the example shown in FIG. 2, PTF-1 (block 212) includes three different CSECTs (CSECT1, CSECT2, and CSECT3). PTF-2 (block 216) includes two different CSECTs (CSECT2 and CSECT 3). In between block 216 and block 212, the arrow indicates that PTF-2 requires PTF-1. In other words, PTF-1 must be installed first in order to install PTF-2.

Similarly, PTF-3 (block 223) includes two different CSECTs (CSECT4 and CSECT5). PTF-4 (block 224) includes two different CSECTs (CSECT6 and CSECT7).

This information is gathered together in a database entry. The database entry, which is comprised of only order information can be derived from a "click" which is used as an indicator record to capture software events. This click information can be passed to a hardware tester portion (block 230). In the hardware tester, the various CSECTs are analyzed to determine how many clicks are present in the hardware. As shown in block 230, CSECT1 of PTF-1 is lightly used, with only 2 clicks within a certain time period. CSECT2 and CSECT3 of PTF-1 are not tracked because PTF-2 overlaps PTF-1, implying a dependency. In contrast, CSECT2 and CSECT3 of PTF-2 are more heavily used, with 100 and 50 clicks, respectively, during the same time period, since it is the more current PTF on top of PTF-1. Similarly, CSECT4 and CSECT5 of PTF-3 are more heavily used, with 100 and 500 clicks, respectively, during the same time period, As are CSECT6 and CSECT7. In addition, for CSECT6 and CSECT7, this demonstrates PTF-4's complete independence from the other PTFs.

This information from block 230 can be forwarded back to block 210. At block 210, the CSI can be refined (if needed using log information, function call information, and the like (from block 230)) based on the hardware information. In such a manner, a "heat map" can be generated that details how the computer system is running based off of the current configuration of the computer system. From this point, the data can be cross-referenced with the PTF data to generate an order. This information can then be sent to central database 150.

Figure 3:
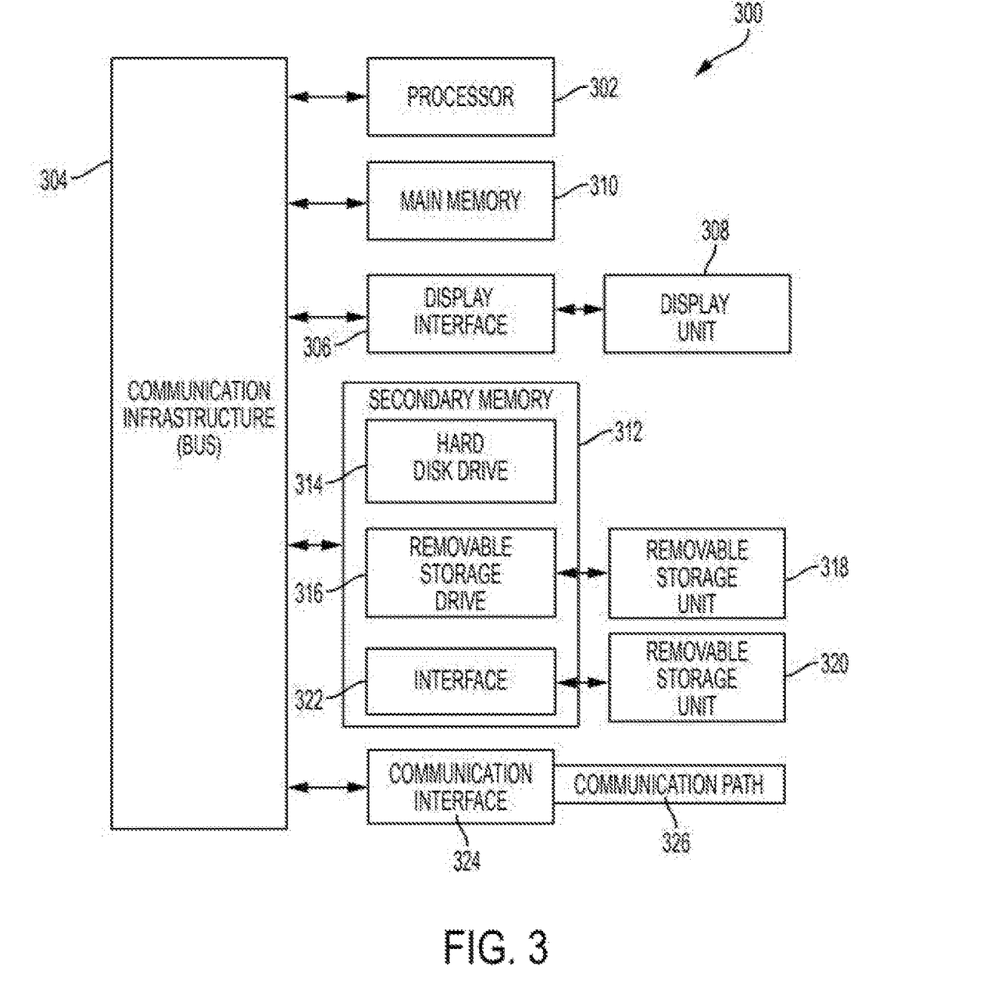
FIG. 3 is a block diagram of a computer system that can be used to implement one or more embodiments.
Figure 5:
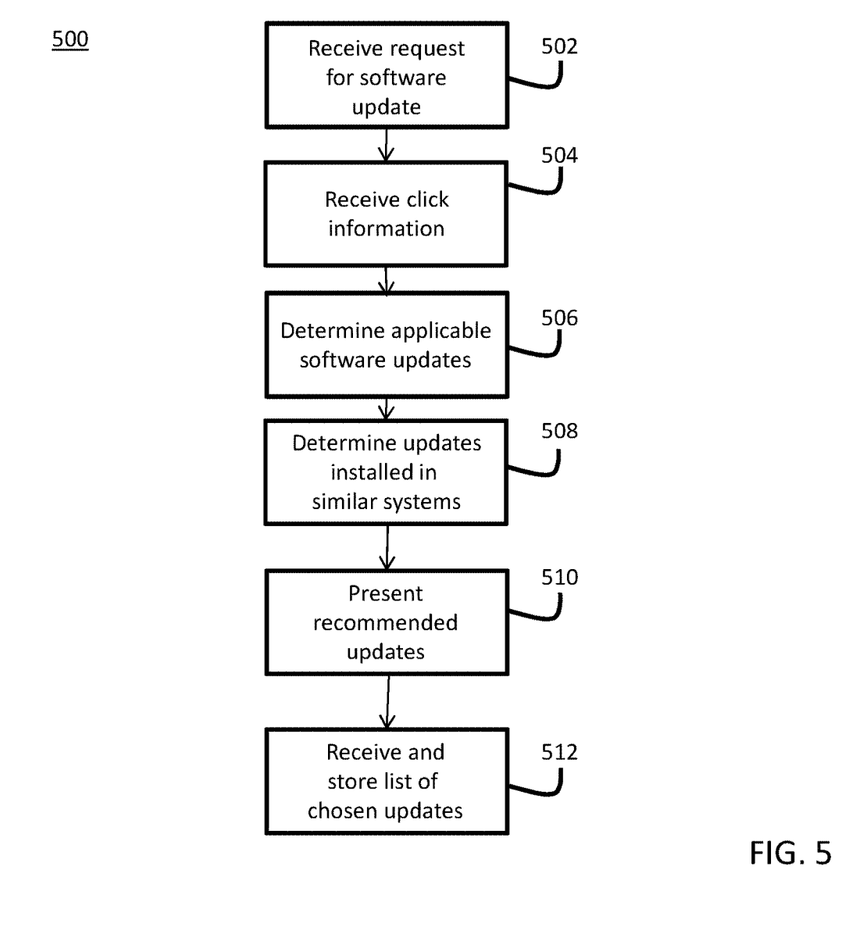
FIG. 5 is a flowchart illustrating the process of one or more embodiments.

A flowchart illustrating method 500 is presented in FIG. 5. Method 500 is merely exemplary and is not limited to the embodiments presented herein. Method 500 can be employed in many different embodiments or examples not specifically depicted or described herein. In some embodiments, the procedures, processes, and/or activities of method 500 can be performed in the order presented. In other embodiments, one or more of the procedures, processes, and/or activities of method 500 can be combined or skipped. In one or more embodiments, method 500 is performed by a processor as it is executing instructions. In some embodiments, method 500 is performed by computer system 300.

Method 500 illustrates the steps taken in one or more embodiments. A request is received from a requesting computer system for a software update (also known as a patch or PTF) (block 502). Click data is gathered from the requesting computer system (block 504). As described above with respect to FIG. 2, the click data includes information about the computer system, including the hardware of the system and the software included in the system. The clicks also include the specifics as to the applicability of each software update to the particular computer system.

Applicable software updates are determined (block 506). This can be performed locally. This can be a subset of all available software updates, based on the installed hardware and software of the requesting computer system. To take a simplified example, a patch for a specific storage unit will only apply to a computer system that includes that particular storage unit. On the other hand, a computer system that includes a dozen storage units will find the patch more applicable than it will be to a computer system that includes a single storage unit. The same process can occur for software—the software installed on the requesting computer system is determined such that the software updates that are appropriate to the requesting computer can be determined. For example, a software update specific to software that is not installed on the requesting computer system is deemed not necessary for the requesting computer system. In addition, if a software update is due to an interaction between two pieces of software or between specific hardware and software combination can be deemed not necessary if the requesting computer system does not include the software or hardware of the software update. Block 502, 504, and 506 may be performed within a local system, such as requesting system 110 of FIG. 1.

The software updates that were most commonly installed in similar computer systems are determined (block 508). This can first involve determining similar computer systems. Similarity between computer systems can be determined in a variety of different manners. For example, a similarity score can be assigned based on the similarity of hardware and software. In some embodiments, a machine-learning algorithm can be used to assign the similarity score. The similarity score can be configured such that a higher similarity score indicates a higher similarity between the hardware and software of various computer systems. The software updates of systems with a similarity score above a certain score can be placed in a list. The machine-learning algorithm can be used to determine which similarity scores are determined to be relevant for purposes of block 508. Block 508 may be performed within a central database, such as central database 150 of FIG. 1.

A list of recommended updates is presented to the requesting computer system (block 510). The list can be the one generated in block 508, created by determining the most commonly installed software updates in similar computer system. Using the list of recommended software updates, a user of the requesting computing system can choose which software updates to install (block 512). The selected software updates are noted and stored in a database, along with information about the hardware and software of the requesting computer system. In such a manner, generated recommendations for future computer systems can remain accurate. Order data can be used in unison with other segmented customer order data to recommend the software updates based off other similar customer setups. In some embodiments, the order data acts as a type of proxy to represent a similar customer's setup without having to transmit detailed information about the computer system specifications.

FIG. 3 depicts a high-level block diagram of a computer system 300, which can be used to implement one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can also include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
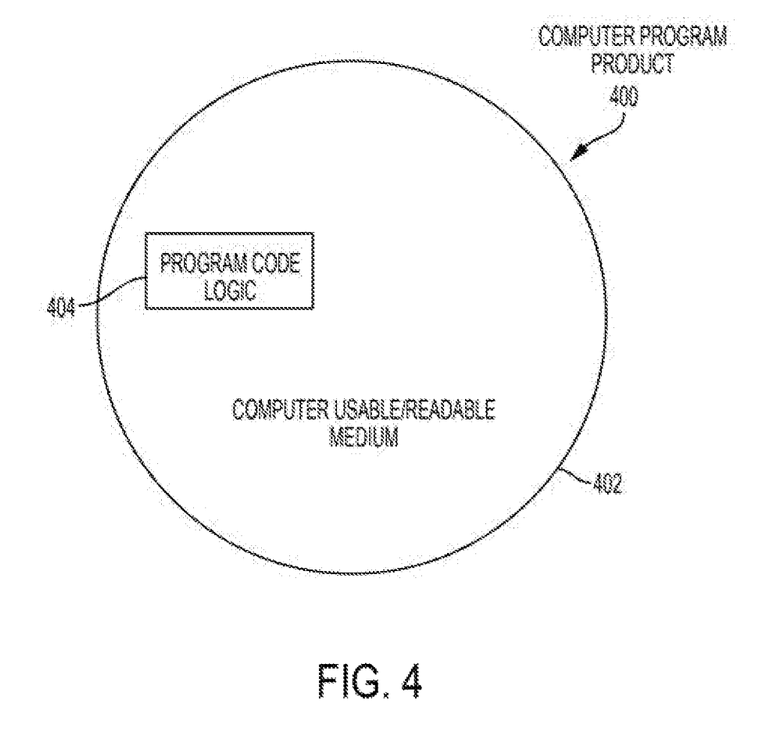
FIG. 4 is a block diagram illustrating a computer program product that can be used to implement one or more embodiments.

Referring now to FIG. 4, a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer-implemented method for recommending software updates for a mainframe computer system, the method comprising:
   receiving a request to find software updates from a requesting mainframe computer system;
   analyzing specifications of the requesting mainframe computer system, wherein analyzing specifications of the requesting mainframe computer system comprises:
      determining hardware components of the requesting mainframe computer system;
      wherein determining hardware components comprises determining performance of the hardware components;
      wherein determining performance of the hardware components comprises using counters to determine existence of performance issues; and
      wherein using counters comprises:
         grouping a software update into one or more code sections (CSECTS),
         determining a number of counted execution instances (clicks) used to process each CSECT, and
         using the number of clicks to determine existence of performance issues; and
      determining software installed on the requesting mainframe computer system;
   determining similar mainframe computer systems that have installed software updates;
   determining a subset of software updates for recommendation based on the specifications of the requesting mainframe computer system and the software updates installed on the similar mainframe computer systems;
   presenting, to a system administrator of the requesting mainframe computer system, the subset of software updates to the requesting mainframe computer system;
   installing at least one software update of the subset of software updates; and
   storing each installed software updates in a database.

2. The computer-implemented method of claim 1, wherein:
   using counters further comprises determining dependencies between CSECTS.

3. The computer-implemented method of claim 1, wherein:
   the existence of performance issues is used to determine the subset of software updates for recommendation.

4. The computer-implemented method of claim 1, wherein:
   determining a subset of software updates based on determining the similar mainframe computer systems comprises determining software updates installed on similar mainframe computer systems.

5. A computer system for recommending software updates, the system comprising:
   a memory; and
   a processor system communicatively coupled to the memory;
   the processor system configured to perform a method comprising:
      receiving a request to find software updates from a requesting mainframe computer system;
      analyzing specifications of the requesting mainframe computer system, wherein analyzing specifications of the requesting mainframe computer system comprises:
         determining hardware components of the requesting mainframe computer system;
         wherein determining hardware components comprises determining performance of the hardware components;
         wherein determining performance of the hardware components comprises using counters to determine existence of performance issues; and
         wherein using counters comprises:
            grouping a software update into one or more code sections (CSECTS),
            determining a number of counted execution instances (clicks) used to process each CSECT, and
            using the number of clicks to determine existence of performance issues; and
         determining software installed on the requesting mainframe computer system;
      determining similar mainframe computer systems that have installed software updates;
      determining a subset of software updates for recommendation based on the specification of the requesting mainframe computer system and the software updates installed on the similar mainframe computer systems; and
      presenting, to a system administrator of the requesting mainframe computer system, the subset of software updates to the requesting mainframe computer system;
      installing at least one software update of the subset of software updates; and
      storing each installed software update in a database.

6. The computer system of claim 5, wherein:
   using counters further comprises determining dependencies between CSECTS.

7. The computer system of claim 5, wherein:
   the existence of performance issues is used to determine the subset of software updates for recommendation.

8. A computer program product for recommending software updates for a mainframe computer system comprising:
   a computer-readable storage medium having program instructions embodied therewith, wherein the computer-readable storage medium is not a transitory signal per se, the program instructions readable by a processor system to cause the processor system to perform a method comprising:
      receiving a request to find software updates from a requesting mainframe computer system;
      analyzing specifications of the requesting mainframe computer system, wherein analyzing specifications of the requesting mainframe computer system comprises:
         determining hardware components of the requesting mainframe computer system;
         wherein determining hardware components comprises determining performance of the hardware components:
         wherein determining performance of the hardware components comprises using counters to determine existence of performance issues; and
         wherein using counters comprises:
            grouping a software update into one or more code sections (CSECTS), determining a number of counted execution instances (clicks) used to process each CSECT, and using the number of clicks to determine existence of performance issues; and determining software installed on the requesting mainframe computer system determining similar mainframe computer systems that have installed software updates;

determining a subset of software updates for recommendation based on the specification of the requesting mainframe computer system and the software updates installed on the similar mainframe computer systems;

presenting, to a system administrator of the requesting mainframe computer system, the subset of software updates to the requesting mainframe computer system;

installing at least one software update of the subset of software updates; and storing each installed software update in a database.

* * * * *